Jan. 16, 1962 H. J. CVETKO ET AL 3,017,467

METHOD OF ASSEMBLY OF PHONOGRAPH PICKUP CARTRIDGES

Filed Aug. 27, 1959

INVENTORS
HENRY J. CVETKO
CHARLES J. CHAPIN

BY Francis J. Klempay
ATTORNEY

United States Patent Office 3,017,467

Patented Jan. 16, 1962

3,017,467

METHOD OF ASSEMBLY OF PHONOGRAPH PICKUP CARTRIDGES

Henry J. Cvetko, Geneva, and Charles J. Chapin, Conneaut, Ohio, assignors to The Astatic Corporation, Conneaut, Ohio, a corporation of Ohio Filed Aug. 27, 1959, Ser. No. 836,516
3 Claims. (Cl. 179—100.41)

The present invention relates generally to the art of recording and reproducing sound and more particularly to the fabrication or assembly of phonograph pickup cartridges.

As will be understood by those skilled in the art, a phonograph pickup cartridge comprises a cartridge housing usually composed of a pair of abutting housing halves, one or more transducer elements for converting mechanical undulations into proportional electrical signals and a stylus holder mounting one or more groove engaging stylus tips and adapted to transmit the movement of the stylus tip or tips to the transducer element or elements. In the production and assembly of phonograph pickup cartridges extreme emphasis is placed upon the indexing, aligning, gauging and the relative positioning of the various component parts. This is particularly true in the fabrication of a stereophonic pickup cartridge having a pair of transducer elements since it is absolutely essential that the transducer elements respond equally to the two channels of stereophonic information recorded in the continuous groove of an ancillary record disc.

It is the prime or ultimate object of the present invention to provide means for achieving very accurate alignment and positioning of the various component parts of a phonograph pickup cartridge in lateral, vertical, longitudinal and angular directions.

Another object of the invention is the provision of means for assembling a phonograph pickup cartridge wherein proper and desired clearances between the various operating parts thereof are insured.

Yet another object of the invention is to provide means for the assembly of a phonograph pickup cartridge which accurately controls the projection of the stylus holder from the cartridge housing.

A further and very important object of this invention is to provide assembly means for phonograph pickup cartridges which contributes materially in achieving balanced outputs from the two transducer elements of a stereophonic phonograph pickup cartridge.

Still a further object is to provide means for the assembly of phonograph pickup cartridges which is characterized by its extreme simplicity and low cost. In a phonograph pickup cartridge wherein the stylus tips are permanently attached, the ease and cost of assembly become particularly important since the entire phonograph pickup cartridge must be replaced from time to time when the stylus tips become worn. The permanently attached stylus tips allow reduction in the mass of the phonograph pickup cartridge and hence improved performance thereof. The added cost due to replacement of the entire phonograph pickup cartridge is at least partially offset by the means of assembly of the present invention.

These, as well as other objects and advantages of the invention, will become more fully apparent upon consideration of the following specification and accompanying drawing wherein there is disclosed a preferred embodiment of the invention.

Figure 1:
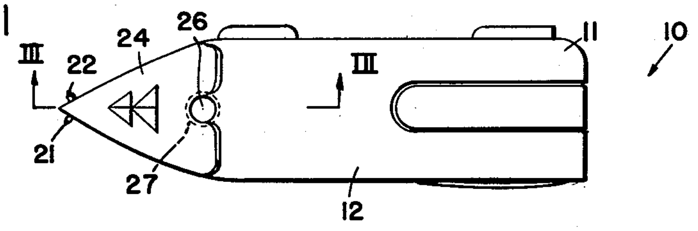
FIGURE 1 is a side elevational view of a phonograph pickup cartridge capable of being assembled in accordance with the teachings of this invention.

Referring now to the drawing, the reference numeral 10 designates generally the phonograph pickup cartridge of the sterophonic "plug-in" type. The teachings of the present invention are particularly adapted, although not specifically limited, to the assembly of stereophonic "plug-in" type phonograph pickup cartridges such as those shown in co-pending U.S. patent application Ser. No. 782,571, filed December 23, 1958, co-pending U.S. patent application Serial No. 803,148, filed March 31, 1959, and co-pending U.S. design patent application Serial No. 56,297, filed June 10, 1959. These co-pending applications are assigned to the assignee of the present invention.

The phonograph pickup cartridge 10 comprises a cartridge housing 11 which is provided by a pair of mating housing halves 12 and 13. The housing halves 12 and 13 are preferably formed of plastic or like material by molding, for example, and each has a semi-cylindrical cavity therein. When the adjacent edges of the housing halves 12 and 13 are abutted the cartridge housing is provided having a longitudinally extending and generally cylindrical internal cavity 14 which is adapted to receive a transducer assembly designated by the reference numeral 15.

The transducer assembly 15 comprises a pair of angularly disposed transducer elements 16 and 17, having their rear set of ends secured in a resilient clamp bushing, not shown, and which are surrounded intermediate their ends by compliant and resilient bender bushing 18. Carried on the forward set of ends of the transducer elements 16 and 17 is a stylus holder 19 that mounts on its forward portion 20 a pair of angularly related record groove engaging stylus tips 21 and 22. The stylus holder 19 has its rear end 23 secured attached to the transducer elements 16 and 17 by means of suitable cement, for example. As will be observed, the stylus holder 19 comprises a plurality of parts and this in accordance with the teachings of the above mentioned co-pending patent application Serial No. 803,148 which is made of record for those desiring a more detailed description of the construction, utilization and operation of the stylus holder.

The housing halves 12 and 13 are each provided with side walls 24 and 25, respectively, which extend forwardly and whose respective upper and lower edges converge toward each other to protect the forwardly projecting stylus holder 19. In the side wall 24 of the housing half 12 there is provided a cylindrical bore 26 while in the side wall 25 of the housing half 13 a bore 27 is provided. The cylindrical bore 27 is substantially larger in diameter than the bore 26 but it will be noted that the axes of these bores are transversely aligned with respect to each other. The bores 26 and 27 are also disposed in transverse relation with respect to the longitudinal center line of the cartridge housing.

In the rear end 23 of the stylus holder 19 there is provided a cylindrical bore 28. Bore 28 is of exactly the same size as the bore 26 in the side wall 24 of the housing half 12 and has its axis disposed exactly ninety degrees from the vertical center line of the stylus tips 21 and 22 and also in the same relation with respect to the longitudinal center line of the cartridge housing. All three of the cylindrical bores—26, 27 and 28—are formed in their respective component parts at the time of molding the same and hence their location and sizes are controlled with the precision customary in plastic molding techniques.

The bore 28 in the stylus holder 19 provides, as will be later explained, a convenient means for properly positioning the transducer assembly within the cartridge housing. Also, the bore 28 substantially reduces the mass of the stylus holder to greatly curtail directly radiated sound, commonly referred to as "needle talk" in the art, whereby the performance of the phonograph pickup cartridge is substantially improved.

To allow accurate assembly of the various component parts of the phonograph pickup cartridge we provide a gauging or locating pin 29. The gauging pin 29, which may be part of a larger clamping fixture or may be a simple manually held tool, comprises a relatively large diameter portion 30, an intermediate diameter portion 31, and an elongated and small diameter portion 32. The small diameter portion 32 of the gauging pin is dimensioned to slide smoothly through the cylindrical bores 26 and 28 in the housing half 12 and the stylus holder 19, respectively. The intermediate diameter portion 31 is of a size whereby the same may slide smoothly into bore 27 in the housing half 13 but this intermediate diameter portion cannot pass through the bores 26 and 28. The large diameter portion 30 is of such a size that it will not pass into or through any of the bores 26–28.

An accurately machined shoulder or annular flange 33 is provided at the junction of the large diameter portion 30 and the intermediate diameter portion 31 while a somewhat smaller shoulder or annular flange 34 is formed at the junction of the intermediate diameter portion 31 and the small diameter portion 32. The axial distance between the annular shoulders 33 and 34, and hence the length of the intermediate diameter portion 31, is made to equal exactly the calculated and desired distance between the outer face of the side wall 25 of the housing half 13 and the adjacent side of the stylus holder 19. The length of the intermediate diameter portion 31 equals one-half the distance between the outer faces of the side walls 24 and 25 minus one-half the length of the cylindrical bore 28 in the stylus holder 19. The smaller diameter portion 32 has a length which is substantially greater than the distance from the outer face of the side wall 24 to the furthest side edge of the stylus holder 19.

Figures 2, 3:
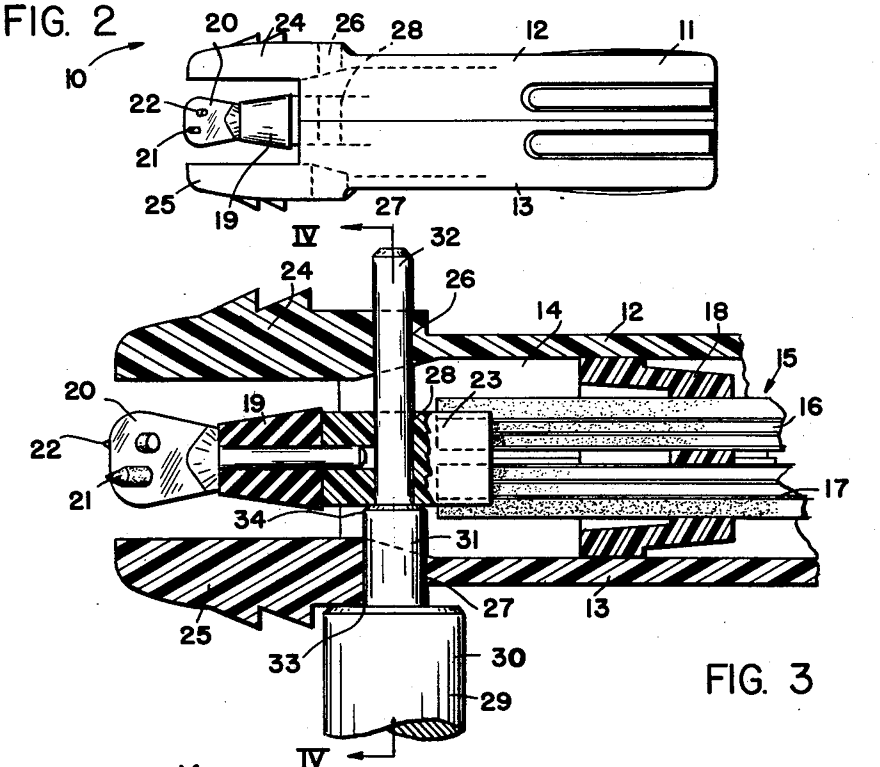
FIGURE 2 is an undersided plan view of the phonograph pickup cartridge shown in FIGURE 1.
FIGURE 3 is an enlarged fragmentary sectional view taken along the section line III—III of FIGURE 1 but with the gauging or locating pin in position at assembly.
Figure 4:
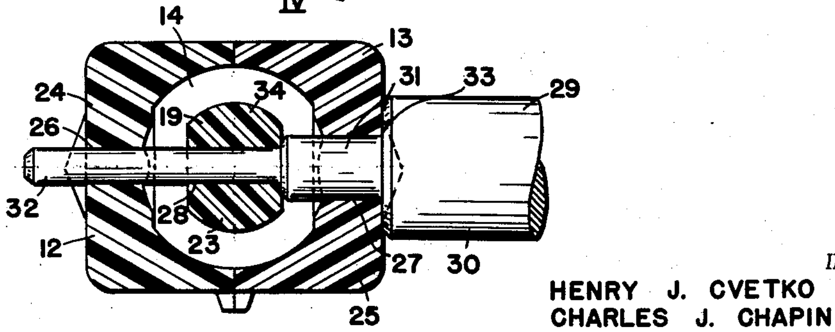
FIGURE 4 is an enlarged end sectional view taken along the section line IV—IV of FIGURE 3.

Considering now the utilization of the gauging pin 29 in assembling a phonograph pickup cartridge, the housing half 13 is slipped over the gauging pin 29 and the outer surface of the side wall 25 is brought to bear against the large shoulder 33. Next, the transducer assembly 15, which has been preassembled by attaching the stylus holder to the tranducer elements and by properly positioning the clamp and bender bushings over the transducer elements, is slipped over the gauging pin until the outer surface of the stylus holder 19 rests upon the shoulder 34 with bore 28 in the stylus holder engaging the small diameter portion 32 of the gauge pin. The housing half 12 is then slipped over the small diameter portion 32 of the gauging pin and the mating inner surfaces of the housing halves 12 and 13 are cemented or otherwise rigidly secured to each other. After the housing halves 12 and 13 are secured to each other the gauging pin is removed by retracting the same downwardly from the position shown in FIGURE 3 of the drawing. With the gauging pin removed it will be apparent that the various component parts of a phonograph pickup cartridge so assembled are in perfect alignment and register with respect to all directions—including lateral, vertical, longitudinal and angular directions.

The angular and longitudinal placement of the transducer assembly 15 within the internal cavity 14, the angular disposition of the stylus tips 21 and 22 with respect to the outer surfaces of the housing halves 12 and 13 and the lateral disposition of the stylus holder 19 and transducer elements 16 and 17 centrally within the internal cavity 14 are all accurately controlled and insured. The axial location of the stylus holder 19 midway between the upper and lower edges of side walls 24 and 25 is controlled and hence the projection of stylus tips 21 and 22 above and below these side walls is fixed. The arrangement is such that complete and universal alignment between the various component parts of the phonograph pickup cartridge is achieved. As mentioned previously, this is particularly important in the fabrication of a stereophonic phonograph pickup cartridge since, if the transducer elements are exactly the same, the transducer assembly must be very accurately positioned if the transducer elements are to respond equally to the two channels of recorded stereophonic information. The ease and simplicity of assembly allows the very efficient production of great quantities of phonograph pickup cartridges all having the same and a universally high degree of operating characteristics.

Although we have accomplished the objects initially set forth, it should be understood that many changes may be made in the above described embodiment without departing from the teachings of the present invention. Accordingly, reference should be had to the following appended claims in determining the true spirit and intent of the invention.

We claim:

1. The method of assembling phonograph pickup cartridges of the kind having an elongated and generally tubular housing which is open at its forward end and having an elongated mechano-electrical transducer positioned centrally and longitudinally in the housing with its rear end portion clamped within the housing and its forward end portion affixed to a stylus-mounting member, comprising the steps of forming aligned apertures in diametrically opposite side wall portions of said housing, forming a transverse bore in said member in such position and orientation that when said assembled member and transducer are properly located within said housing said bore will be aligned with said apertures, and during the assembly of the parts inserting a gauge pin through said apertures and said bore in a close sliding fit with said apertures and bore whereby the longitudinal position relative to said housing of said member and a stylus carried thereby will be accurately controlled and whereby the angular position of said member and stylus with respect to any longitudinal plane of said housing will be accurately controlled.

2. The method of claim 1 further characterized in that one of said apertures is of larger diameter than the other so that said gauge pin may be provided with a shoulder to engage a side surface of said member and thereby accurately locate the same between the said side wall portions of the housing upon insertion of the gauge pin a predetermined extent from the side wall portion having the larger-diametered aperture.

3. The method of claim 2 including the further step of controlling the extent of insertion of the gauge pin by forming said gauge pin with a second shoulder which engages the outer surface of the side wall portion of the housing having the larger-diametered aperture.

References Cited in the file of this patent

UNITED STATES PATENTS

| | | |
|---|---|---|
| 1,365,291 | Stephens et al. | Jan. 11, 1921 |
| 2,476,848 | Eckhardt et al. | July 19, 1949 |
| 2,564,921 | Parrish | Aug. 21, 1951 |
| 2,934,610 | Dieter | Apr. 26, 1960 |